3,169,119
POLYSULFIDE POLYURETHANES
Gerhard Dankert, Cologne-Flittard, and Hans Holt-schmidt, Cologne-Stammheim, Germany, assignors to Farbenfabriken Bayer Aktiengesellschaft, Leverkusen, Germany, a corporation of Germany
No Drawing. Filed Mar. 28, 1961, Ser. No. 98,767
Claims priority, application Germany, Apr. 6, 1960, F 30,933
18 Claims. (Cl. 260—2.5)

This invention relates to polyurethane plastics and more particularly to polyurethane plastics prepared from sulfur base polymers.

It is known according to U.S. Patent 2,814,600 to prepare cellular resins from arylene diisocyanates and liquid polysulfide polymers, for example, the one made by heating sodium polysulfide with a mixture containing 98 percent di-(chloroethyl)formal and 2 percent of 1,2,3-trichloropropane to form a polymer of fairly high molecular weight and then reducing this polymer to split some of the polysulfide linkages and convert them to sulfhydryl groups. The cellular resin prepared by this process has mechanical properties inferior to those of conventional cellular polyurethane resins and, moreover, it is diffcult to carry out the reaction because of the unreactive nature of the —SH group thus requiring long reaction times, high reaction temperatures and/or extremely active catalysts.

Another U.S. Patent 2,929,794 proposes the use of sulfur base polymers such as polymeric polysulfides for reaction with prepolymers prepared from a polyisocyanate and a diol. No method is proposed in the patent for introducing terminal groups other than sulfhydryl groups so that the polysulfide will react with an organic polyisocyanate under ordinary reaction conditions.

The polythiourethanes based on these polymeric polysulfides have an extremely unpleasant odor in addition to having very poor mechanical properties. However, their resistance to organic solvents and particularly aromatic solvents is outstanding. Polyurethanes based on conventional polyesters, polyethers, polythioethers and the like are not as resistant as desirable to aromatic solvents but have excellent mechanical properties. Furthermore, the polysulfides are known to split at relatively low temperatures at the polysulfide linkages to form lower molecular weight products containing terminal sulfhydryl groups.

It is, therefore, an object of this invention to provide polyurethane plastics prepared from sulfur base polymers such as polymeric polysulfides which are substantially devoid of the foregoing disadvantages. Another object of this invention is to provide new polyhydroxyl compounds prepared from sulfur base polymers such as polymeric polysulfides which have only a verly slight odor, if any. A further object of this invention is to provide polyurethane plastics having good resistance to organic solvents and particularly aromatic solvents and simultaneously having good mechanical properties. Still a further object of this invention is the preparation of polysulfide polymers which have improved mechanical properties. Another object of this invention is to provide cellular polyurethane plastics, polyurethane coatings, adhesives, elastomers, casting resins and the like based on polymeric polysulfides which have combined low sensitivity to aromatic substances, good tensile strength, good breaking elongation, good elasticity and only a very slight odor. Another object of this invention is to provide a method of modifying plymeric polysulfides so that they may be used for the preparation of improved polyurethane plastics.

The foregoing objects and others which will become apparent from the following description are accomplished in accordance with the invention, generally speaking, by providing polyurethanes obtained by a process which comprises reacting an organic polyisocyanate with a polyhydroxyl compound having a molecular weight of from about 500 to about 10,000 which has been prepared by a process which comprises reacting an $\omega,\omega'$-dihydroxydialkyl polysulfide with formaldehyde. Included within the scope of this invention, therefore, a polyurethanes which have extremely low sensitivity to aromatic solvents combined with good tensile strength, good breaking elongation, good elasticity and which only have a very slight odor. These polyurethanes prepared from sulfur base polymers are preferably prepared from polyacetals which have terminal aliphatic hydroxyl groups. The polyhydroxyl compound used for reaction with the organic polyisocyanate is prepared by reacting an $\omega,\omega'$-dihydroxydialkyl polysulfide which preferably has the general formula

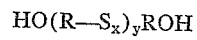

$$HO(R—S_x)_yROH$$

wherein R is an alkylene radical preferably having from 2 to 5 carbon atoms, $x$ is a number of from 2 to 5 and $y$ is an integer preferably below about 15 by reacting the polysulfide with a formaldehyde yielding substance preferably in the presence of a catalyst which will split off water to form a product having a molecular weight of from about 500 to about 10,000.

Any suitable $\omega,\omega'$-dihydroxydialkyl polysulfide may be used such as, for example, $\gamma,\gamma'$-dihydroxydipropyl disulfide, $\beta,\beta'$-dihydroxydiethyl tetrasulfide, $\beta,\beta'$-dihydroxydiethyl trisulfide, $\beta,\beta'$-dihydroxydiethyl disulfide, $\omega,\omega'$-dihydroxydibutyl disulfide, $\omega,\omega'$-dihydroxydipentyl disulfide, $\beta$-hydroxy ethyl, $\gamma$-hydroxy propyl disulfide, $\beta,\beta'$-dihydroxydiethyl pentasulfide and the like. Other suitable polysulfide resins are disclosed in U.S. Patent 2,466,936. It is also possible to employ reaction products of alkylene oxides such as ethylene oxide, propylene oxide, butylene oxide, styrene oxide, cyclohexene oxide, epichlorohydrin and the like with $Na_2S_x$ where $x$ is 2 to 5, and/or hydrogen sulfide and sulfur.

It is also possible to use other organic compounds containing at least two active hydrogen containing groups as determined by the Zerewitinoff method said groups being reactive with an isocyanato group to yield a polyurethane, polyamide or polyurea and preferably having a molecular weight of about 90–5,000, including, for example, sulfur free polyhydric alcohols such as hexene diol, diethylene glycol, butane-bis-$\beta$-dihydroxyethyl ether, glycerine, trimethylol propane, hydroxyl polyesters obtained from polyhydric alcohols and polycarboxylic acids such as, for example, the polyester obtained from adipic acid, ethylene glycol and/or trimethylol propane, polyhydric polyalkylene ethers such as, for example, those obtained from the condensation of alkylene oxides such as polypropylene ether glycol having a molecular weight of 600, 1200 or 2000, polythioether glycols such as are obtained by the self-condensation of thiodiglycol having a molecular weight of about 2000 and the like. If the advantageous resistance to aromatic substances is to be obtained in accordance with the invention, then at least 50 percent of the hydroxyl compound should preferably be the polyacetals based on the polysulfide of the invention.

Any suitable formaldehyde may be used for reaction with the $\omega,\omega'$-dihydroxydialkyl polysulfides including formaldehyde per se, paraformaldehyde and compounds which contain labile methylol groups such as, for example, trimethylol ethane.

It is preferred to carry the reaction out in the presence of an acid catalyst which will split off water such as sulfuric acid, sulfurous acid, phosphoric acid, phosphonic acid, phosphinic acid, maleic acid, toluene sulfonic acid as well as other aromatic sulfonic acids and the like. Any suitable catalytic amount may be used but it is preferred to use from about 0.01 percent to about 10 percent by weight of the catalyst based on the weight of the reaction mixture. The reaction mixture may be neutralized by destroying the acid with an alkaline substance such as, for example, calcium carbonate, potassium carbonate and the like.

The reaction of the polymeric polysulfide with formaldehyde, i.e., the polyacetylation, may be carried out either by azeotropic dehydration or under partial vacuum. The degree of condensation is followed by determining the viscosity and hydroxyl number of the product and it is possible to produce materials having a different viscosity and molecular weight by varying the reaction time. The products are practically odorless, light yellow in color and are obtained in practically quantitative yields. The higher sulfur content serves to increase the resistance of the products to aromatic substances. Because linear polyacetals can be prepared from the ω,ω'-dihydroxydialkyl polysulfides containing different amounts of sulfur, the physical properties of the polyurethanes can be varied over wide limits. Branched polyacetals can be obtained by including some trihydric or higher polyhydric alcohol in the condensation of formaldehyde such as, for example, trimethylol propane, glycerine, pentaerythritol, mannitol, N,N,N',N'-tetrakis-2-hydroxy propyl ethylene diamine and the like.

It was not to be expected that the polysulfides would withstand elevated temperatures of about 80° C. to about 140° C. which are the preferred temperatures for the production of the polyacetals without the splitting of the sulfur to sulfur bonds to form relatively unreactive sulfhydryl groups in the production of the polyacetals of the invention. The ω,ω'-dihydroxydialkyl polysulfides are preferably reacted with the formaldehyde at a temperature of from about 80° C. to about 140° C. and there is no degradation of the said polysulfide by splitting of the sulfur to sulfur bond.

It is possible in accordance with the invention to prepare either porous or nonporous polyurethane plastics including castings, moldings and coating compositions as well as caulks, sealants, putties, adhesives and the like.

Any suitable organic polyisocyanate may be used to prepare the polyurethane plastic of the invention including, for example, aromatic, aliphatic and heterocyclic polyisocyanates. In other words, two or more isocyanato radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate. Also to be mentioned are dimeric toluylene diisocyanate, trimerized diisocyanate such as trimerized toluylene diisocyanate and the like.

Substantially nonporous polyurethane plastics may be prepared by either the casting technique or by the so-called millable gum technique. Castings are prepared by mixing either a monomeric polyisocyanate or a prepolymer containing terminal isocyanato groups which is prepared by reaction of an excess of an organic polyisocyanate with the polyacetals with an organic chain extending agent such as, for example, a polyhydric alcohol including ethylene glycol, butylene-1,3-gycol, butylene-1,4-glycol, trimethylol propane, glycerine and the like or organic primary amines such as, for example, ethylene diamine, hexamethylene diamine, 3,3'-dichlorobenzidine and the like as well as aromatic base polyhydric alcohols such as, for example, p-phenylene bis-β-hydroxyethyl ether and the like. Best results are obtained when an isocyanate modified compound is prepared in a first step by reacting an excess of organic polyisocyanate with the hydroxyl terminated product of an ω,ω'-dihydroxydialkyl polysulfide having the general formula $$HO(R-S_x)_yROH$$

wherein R is an alkylene radical preferably having from 2 to 5 carbon atoms, $x$ is a number of from 2 to 5 and $y$ is an integer preferably below about 15 with formaldehyde until it has a molecular weight between about 500 and about 5000 and an hydroxyl number of from about 40 to about 600 and then mixing the isocyanate terminated product with an organic chain extender under substantially anhydrous conditions and casting the resulting mixture in a mold.

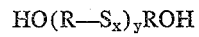

Moldings may be prepared by the millable gum technique by reacting an organic polyisocyanate with the polyacetal in a kneader to obtain a crumbly mass which is then further reacted with an organic polyisocyanate, a polyamine, a polyhydric alcohol, water or other suitable cross-linking agent such as those disclosed above for the preparation of castings on a rubber mill and finally pressed into a mold and allowed to cure. Suitable processes for carrying out this type of reaction may be found in U.S. Patents 2,621,166 and 2,900,368.

Coating compositions may be prepared by reacting an organic polyisocyanate or isocyanate modified prepolymer with the polyacetal based on the polysulfide in an inert organic solvent therefor. Any suitable inert organic solvent may be used such as, for example, xylene, ethyl acetate, toluene, ethylene glycol monoethyl ether acetate and the like. The resulting coating composition may be applied to any suitable substrate in accordance with conventional coating techniques including dipping, brushing, roller coating and the like. Suitable substrates are, for example, wood, paper, metal, such as steel and the like.

Porous polyurethane plastics may be prepared in accordance with the invention either by the so-called one-shot method or by a prepolymer technique. In the one-shot method an organic polyisocyanate is mixed with the polyacetal based on sulfur and a blowing agent such as water or a halohydrocarbon such as dichlorodifluoromethane, trichlorofluoromethane and the like substantially simultaneously whereas in the prepolymer technique an excess of an organic polyisocyanate is first reacted with the polyacetal based on polysulfides and then the resulting prepolymer containing terminal isocyanato groups is reacted with water to prepare a cellular polyurethane plastic. Suitable processes for carrying out the preparation of cellular polyurethane plastics as well as suitable apparatus for the mixing of the components is disclosed in U.S. Reissue Patent 24,514. It is often advantageous in the production of the porous plastics to include other additives in addition to the blowing agents and water including, for example, activators such as tertiary amines such as, for example, triethylene diamine, N-methyl morpholine, N-ethyl morpholine, diethyl ethanolamine, 1-methyl-4-dimethyl amino ethyl piperazine and the like as well as metal compounds including alcoholates and salts and more particularly molybdenum chloride, stannous chloride and other compounds disclosed in U.S. Patent 2,846,408 but preferably the tin salts of polycarboxylic acids and tin alcoholates such as, for example, dibutyl tin di-2-ethyl hexoate, dibutyl tin dilurate, stannous octoate, stannous oleate and the like. Other substances are stabilizers such as emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

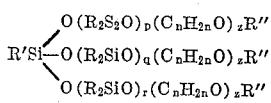

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

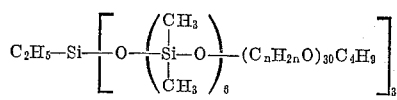

wherein $(C_nH_{2n}O)$ is a mixed polyoxyethylene and oxypropylene block copolymer containing about 17 oxyethylene units and about 13 oxypropylene units.

Instead of using polyisocyanates for the curing, the storable material can also be cured with zinc oxide and known vulcanization accelerators.

According to another embodiment, the curing of the storable material can also be effected with formaldehyde or substances yielding formaldehyde; it is necessary to ensure that the storable material contains, incorporated therein by condensation, aryl dihydroxyalkyl amines such as $\beta,\beta'$-dihydroxy diamino diphenyl or hydroxyalkylated phenols with at least two aliphatic hydroxyl groups such as p-phenylene bis-($\beta$-hydroxy ethyl ether).

These compounds can be incorporated into the polyacetal or they can also be introduced as a chain-lengthening agent during the production of the storable material. Such formaldehyde cross-linking procedures are, for example, described in German patent specification No. 1,063,375.

The products of this invention are useful for the preparation of caulks, sealants, putties and the like for sealing and caulking of various articles including gasoline tanks and the like. The aromatic products also may be used for the production of useful aromatic solvent resistant gear wheels and the like. The cellular polyurethane plastics may be used for the production of both sound and thermal insulation, for example, in the preparation of laminated wall panels.

The invention is further illustrated by the following examples in which the parts are by weight unless otherwise indicated.

*Example 1*

About 1,540 parts of $\beta,\beta'$-dihydroxydiethyl disulfide and about 270 parts of paraformaldehyde are heated with about 300 cubic centimeters of benzene and while stirring to about 80° C. Sulfur dioxide is introduced into this mixture until a pH value of about 2 to about 3 is reached. After completing azeotropic dehydration, the sulfurous acid which is present is neutralized with gaseous ammonia and a polyacetal is obtained which has an —OH number of about 59.

About 100 parts of this polyacetal are dehydrated for about half an hour at about 130° C./18 mm. and stirred with about 32 parts of 1,5-naphthylene diisocyanate and about 7 parts of butane-1,4-diol at about 130° C. The viscous melt is cast on to a support and finally heated for about 24 hours at about 100° C.

Thickness of the test plate _____ mm__ 4.9
Tensile strength _____ kg./cm.² __ 135
Swelling in benzene after 7 days _____ percent__ 10.2

*Example 2*

About 5,580 parts of $\beta,\beta'$-dihydroxydiethyl trisulfide and about 800 parts of paraformaldehyde are heated with addition of about 18 parts of p-toluene sulphonic acid while stirring well and introducing nitrogen to about 110° C. After splitting off about 250 cubic centimeters of water, the substance is further condensed under partial vacuum. After neutralization with potassium carbonate, a polycondensate is obtained which has an hydroxyl number of about 118.

About 100 parts of this polyacetal are dehydrated for about 30 minutes at about 130° C./18 mm. and stirred with about 35 parts of 1,5-napthylene diisocyanate and about 2.4 parts of butane-1,4-diol at about 130° C. The viscous melt is poured on to a support and finally heated for about 36 hours at about 100° C.

Thickness of the test plate _____ mm__ 4.2
Tensile strength _____ kg./cm.² __ 165
Swelling in benzene after 7 days _____ percent__ 3.8

*Example 3*

About 100 parts of the polyacetal obtained according to Example 1 and having an —OH number of about 59 are stirred with about 17 parts of 80 percent of 2,4- and 20 percent 2,6-toluylene diisocyanate and about 0.9 part of water for about 45 minutes at about 60° C. The viscous melt is poured on to a support and is then finally heated for about 12 hours at about 100° C.

Using a rubber roller, about 20 parts of carbon black, about 0.5 part of stearic acid and about 8 parts of dimeric 2,4-toluylene diisocyanate are incorporated into this storable material by rolling. The sheet is vulcanized in a press for about 60 minutes at about 140° C.

It is to be understood that the foregoing examples are given for the purpose of illustration and that any other suitable $\omega,\omega'$-dihydroxydialkyl polysulfide, organic polyisocyanate, formaldehyde yielding substance, cross-linking agent, stabilizer or the like could have been used in the examples in accordance with the preceding disclosure with satisfactory results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. Polyurethane plastics obtained by a process which comprises reacting an organic polyisocyanate with a polyhydroxyl compound having a molecular weight of from about 500 to about 10,000 and prepared by a process which comprises reacting an $\omega,\omega'$-dihydroxydialkyl polysulfide with formaldehyde.

2. Polyurethane plastics obtained by a process which comprises reacting an organic polyisocyanate with a polyhydroxyl compound having a molecular weight of from about 500 to about 10,000 and prepared by a process which comprises reacting an $\omega,\omega'$-dihydroxydialkyl polysulfide having the general formula

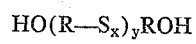

wherein R is an alkylene radical, $x$ is a number of from 2 to 5 and $y$ is an integer from 1 to about 15, with formaldehyde.

3. A process for the preparation of polyurethanes which comprises reactting an organic polyisocyanate with a polyhydroxyl compound having a molecular weight of from about 500 to about 10,000 and prepared by a process which comprises reacting an ω,ω'-dihydroxydialkyl sulfide with formaldehyde.

4. A process for the preparation of cellular polyurethane plastics which comprises reacting an organic polyisocyanate with a polyhydroxyl compound having a molecular weight of from about 500 to about 10,000 and prepared by a process which comprises reacting an ω,ω'-dihydroxydialkyl polysulfide with formaldehyde, and a blowing agent.

5. The process of claim 4 wherein said blowing agent is water.

6. The product of the process of claim 4.

7. A process for the preparation of a substantially non-porous polyurethane casting which comprises reacting an excess of an organic polyisocyanate in a first step with a polyhydroxyl compound having a molecular weight of from about 500 to about 10,000 and prepared by a process which comprises reacting an ω,ω'-dihydroxydialkyl polysulfide with formaldehyde, under substantially anhydrous conditions to prepare an isocyanato terminated prepolymer and subsequently mixing said isocyanato terminated prepolymer with an organic chain extending agent selected from the group consisting of polyhydric alcohols and organic primary amines and casting the resulting mixture in a mold.

8. The product of the process of claim 7.

9. A process for the preparation of moldings which comprises reacting an organic polyisocyanate with an excess of a polyhydroxyl compound having a molecular weight of from about 500 to about 10,000 and prepared by a process which comprises reacting ω,ω'-dihydroxydialkyl polysulfide with formaldehyde, to obtain a crumbly mass which will mill on a rubber mill and milling said mass with a member selected from the group consisting of an organic polyisocyanate, a polyamine having primary amino groups, a polyhydric alcohol and water to obtain a moldable mass and pressing said mass into a mold and allowing it to cure at an elevated temperature.

10. The product of the process of claim 9.

11. A process for the preparation of a coating composition which comprises reacting an organic polyisocyanate with a polyhydroxyl compound prepared by a process which comprises reacting an ω,ω'-dihydroxydialkyl polysulfide with formaldehyde, in an inert organic solvent therefor.

12. The product of the process of claim 11.

13. An isocyanato terminated prepolymer which comprises the reaction product of an excess of an organic polyisocyanate with a polyhydroxyl compound obtained by a process which comprises reacting an ω,ω'-dihydroxydialkyl polysulfide with formaldehyde.

14. A polyurethane casting prepared by a process which comprises reacting an excess of an organic polyisocyanate with a polyol having a molecular weight of from about 500 to about 5000, an hydroxyl number of from about 40 to about 600 and prepared by a process which comprises reacting a ω,ω'-dihydroxy dialkyl polysulfide with formaldehyde, in a first step under substantially anhydrous conditions to prepare an isocyanato terminated prepolymer and mixing said isocyanato terminated prepolymer with a polyhydric alcohol under substantially anhydrous conditions in a second step to obtain a casting composition and casting the resulting mixture in a mold.

15. The polyurethane casting of claim 14 wherein said organic polyisocyanate is 4,4'-diphenylmethane diisocyanate.

16. The polyurethane casting of claim 14 wherein said ω,ω'-dihydroxy dialkyl polysulfide is β,β'-dihydroxy diethyl disulfide.

17. The polyurethane casting of claim 14 wherein said polyhydric alcohol is a butane diol.

18. The polyurethane casting of claim 14 wherein said polyhydric alcohol is p-phenylene-bis-(β-hydroxy ethyl ether).

References Cited in the file of this patent

UNITED STATES PATENTS

| 2,469,404 | Patrick | May 10, 1949 |
| 2,814,600 | Mitchell | Nov. 26, 1957 |
| 2,929,794 | Simon et al. | Mar. 22, 1960 |
| 2,961,428 | Muller et al. | Nov. 22, 1960 |
| 2,999,082 | Holschmidt et al. | Sept. 5, 1961 |
| 3,077,464 | Simon | Feb. 12, 1963 |